US009648629B2

(12) United States Patent
Kang et al.

(10) Patent No.: US 9,648,629 B2
(45) Date of Patent: May 9, 2017

(54) REPEATER FOR SELECTING CHANNEL IN LOCAL COMMUNICATION SYSTEM, AND METHOD THEREOF

(71) Applicant: Samsung Electronics Co. Ltd., Suwon-si, Gyeonggi-do (KR)

(72) Inventors: Noh-Gyoung Kang, Suwon-si (KR); Tae-Han Bae, Seoul (KR); Jae-Seung Son, Suwon-si (KR); Eun-Tae Won, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 114 days.

(21) Appl. No.: 14/027,821

(22) Filed: Sep. 16, 2013

(65) Prior Publication Data

US 2014/0086139 A1    Mar. 27, 2014

(30) Foreign Application Priority Data

Sep. 21, 2012  (KR) .................... 10-2012-0105135

(51) Int. Cl.
| | | |
|---|---|---|
| *H04W 72/08* | (2009.01) | |
| *H04W 72/02* | (2009.01) | |
| *H04L 25/20* | (2006.01) | |
| *H04W 84/04* | (2009.01) | |
| *H04W 84/10* | (2009.01) | |

(52) U.S. Cl.
CPC .......... *H04W 72/082* (2013.01); *H04L 25/20* (2013.01); *H04W 72/02* (2013.01); *H04W 84/047* (2013.01); *H04W 84/10* (2013.01)

(58) Field of Classification Search
CPC ... H04W 72/02; H04W 72/082; H04W 84/10; H04W 84/047
USPC .......................................................... 370/315
See application file for complete search history.

(56) References Cited

U.S. PATENT DOCUMENTS

| | | | |
|---|---|---|---|
| 6,456,848 B1 * | 9/2002 | Freeman et al. | 455/450 |
| 6,611,506 B1 * | 8/2003 | Huang et al. | 370/329 |
| 8,194,884 B1 * | 6/2012 | Johnston | 381/97 |
| 2009/0190541 A1 * | 7/2009 | Abedi | 370/329 |
| 2009/0238093 A1 * | 9/2009 | Saneto | 370/253 |
| 2010/0075689 A1 * | 3/2010 | Uemura et al. | 455/452.1 |
| 2010/0177639 A1 | 7/2010 | Nam | |
| 2012/0057651 A1 * | 3/2012 | Kim | 375/296 |

FOREIGN PATENT DOCUMENTS

| | | |
|---|---|---|
| KR | 10-2004-0028072 A | 4/2004 |
| KR | 10-2005-0024744 A | 3/2005 |
| KR | 10-2010-0083040 A | 7/2010 |

* cited by examiner

*Primary Examiner* — Charles C Jiang
*Assistant Examiner* — George Atkins, Jr.
(74) *Attorney, Agent, or Firm* — Jefferson IP Law, LLP

(57) ABSTRACT

A repeater for selecting a channel in a local communication system, and a method thereof are provided. A repeater of a local communication system includes a transceiver configured to perform at least one of transmitting and receiving a signal, and a controller configured to calculate a degree of interference of an available channel with an adjacent channel, the interference caused when a frequency band of the available channel overlaps partially with a frequency band of the adjacent channel, and to determine that the repeater is to use a channel having a smallest degree of interference as a channel.

20 Claims, 8 Drawing Sheets

REPEATER FOR SELECTING CHANNEL IN LOCAL COMMUNICATION SYSTEM, AND METHOD THEREOF

CROSS-REFERENCE TO RELATED APPLICATION(S)

This application claims the benefit under 35 U.S.C. §119(a) of a Korean patent application filed on Sep. 21, 2012 in the Korean Intellectual Property Office and assigned Ser. No. 10-2012-0105135, the entire disclosure of which is hereby incorporated by reference.

TECHNICAL FIELD

The present disclosure relates to a repeater for selecting a channel in a local communication system, and a method thereof. More particularly, the present disclosure relates to a repeater for determining the states of channels and efficiently selecting a channel, and a method thereof.

BACKGROUND

Among local communication systems, WiFi, which is a registered trademark of Wi-Fi Alliance, is a technology that supports connections of devices to a Wireless Local Area Network (WLAN) based on the Institute of Electrical and Electronics Engineers (IEEE) 802.11 standard. According to Wi-Fi, an Access Point (AP) transmits radio signals according to a device type or a use mode, and receives/transmits data from/to terminals within a specific radius of the AP. For example, terminals located adjacent to an AP can connect to a WLAN through the AP.

According to the related art, an AP selects a specific channel when the AP initially operates, and provides services to terminals through the specific channel. When a terminal tries to initially connect to a WLAN, the terminal transmits a message "Probe Request" through a specific channel, recognizes an AP that has transmitted a response "Probe Response" to the terminal, and then requests the AP to make a connection to the WLAN.

Meanwhile, because an AP does not often change a channel while the AP operates, the AP must select an optimal channel. When a small number of devices use a WLAN band, an AP can select a channel that is not used. However, recently, along with popularized use of a WLAN, finding a channel that is not used is difficult. Further, even when a channel that is not used has been found, if there are many APs using other channels adjacent to the found channel, communication efficiency will deteriorate due to inter-channel interference.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a repeater for efficiently selecting a channel in a local communication system, and a method thereof.

Another aspect of the present disclosure is to provide a repeater for selecting a channel causing the least inter-channel interference in a local communication system, and a method thereof.

In accordance with an aspect of the present disclosure, a repeater of a local communication system is provided. The repeater of a local communication system includes a transceiver configured to perform at least one of transmitting and receiving a signal, and a controller configured to calculate a degree of interference of an available channel with an adjacent channel, the interference caused when a frequency band of the available channel overlaps partially with a frequency band of the adjacent channel, and to determine that the repeater is to use a channel having a smallest degree of interference as a channel.

In accordance with another aspect of the present disclosure, a method in which a repeater selects a channel in a local communication system is provided. The method includes calculating a degree of interference of an available channel with an adjacent channel, the interference caused when a frequency band of the available channel overlaps partially with a frequency band of the adjacent channel, and determining that the repeater is to use a channel having a smallest degree of interference as a channel.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purposes only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It will be understood that, although the terms first, second, and the like may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the singular forms "a", "an" and "the" are intended to include the plural forms as well, unless the context clearly indicates otherwise.

Figure 1:
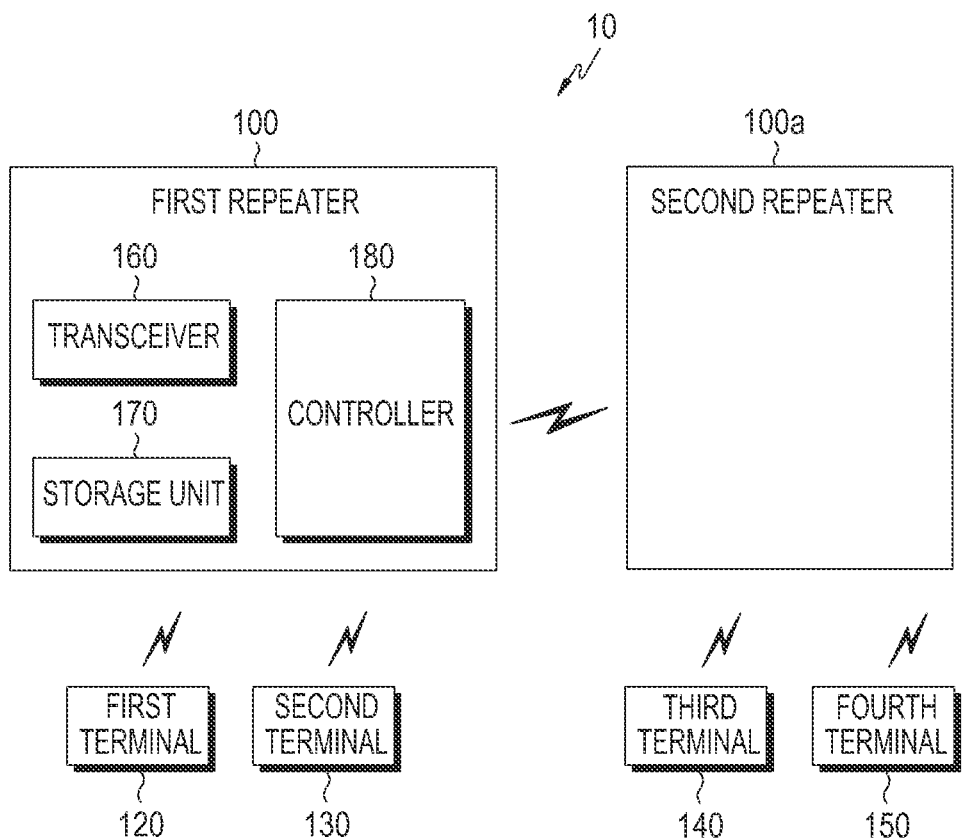
FIG. 1 is a block diagram illustrating a configuration of a local communication system according to an embodiment of the present disclosure.

FIG. 1 is a block diagram illustrating a configuration of a local communication system according to an embodiment of the present disclosure.

Referring to FIG. 1, a local communication system 10 includes at least one repeater such as an Access Point (AP), and at least one terminal. For easy understanding, FIG. 1 illustrates a local communication system 10 assuming that the local communication system 10 includes two repeaters of a first repeater 100 and a second repeater 100a, and four terminals of first terminal 120, second terminal 130, third terminal 140, and fourth terminal 150.

The first repeater 100 may include a transceiver 160 and a controller 180, and may further include a storage unit 170. In the current example, the second repeater 100a may be assumed to have the same configuration as the first repeater 100. Accordingly, the second repeater 100a can be understood based on the following descriptions about the first repeater 100.

The transceiver 160 is configured to communicate with terminals or other repeaters. The first terminal 120 and the second terminal 130 communicate with the transceiver 160 of the first repeater 100. The third terminal 140 and fourth terminal 150 communicate with a transceiver (not shown) of the second repeater 100a. In addition, the first repeater 100 communicates with the second repeater 100a through communication between the transceiver 160 of the first repeater 100 and the transceiver of the second repeater 100a. In the following description, for convenience of description, the first repeater 100 is referred to as a repeater 100.

The controller 180 digitizes the state of each of channels that are used in the local communication system 10. In order to digitize the state of each of the channels that are used in the local communication system 10, the controller 180 calculates a Channel Usage Indexes (CUIs) of available channels that can be used in the local communication system 10, and selects a channel having the smallest CUI as a channel that the repeater 100 is to use. The controller 180 controls overall operations of the repeater 100, including the operation of selecting a channel.

The storage unit 170 stores the CUIs calculated by the controller 180.

Figure 2:
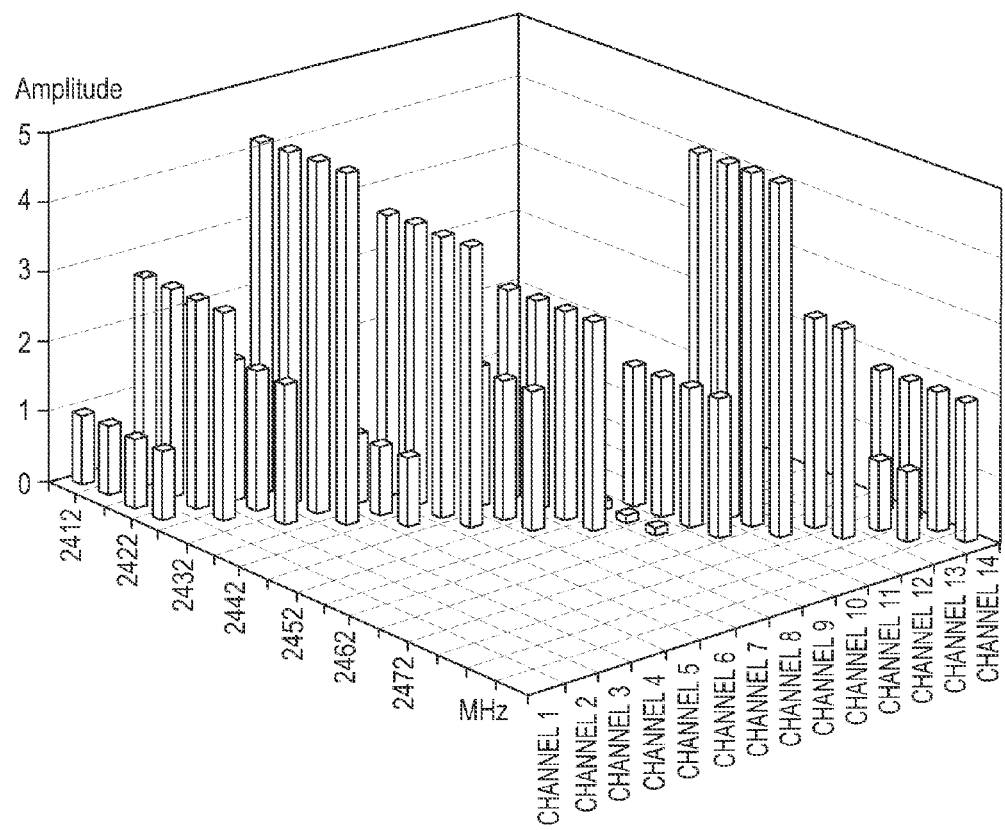
FIG. 2 is a 3-Dimensional (3D) graph showing a current state of channel usage according to an embodiment of the present disclosure.

FIG. 2 is a 3-Dimensional (3D) graph showing a current state of channel usage according to an embodiment of the present disclosure.

Referring to FIG. 2, the local communication system 10 such as the local communication system 10 illustrated in FIG. 1, may manage a plurality of channels, and the individual channels may provide different received signal strengths. Because neighboring channels are not sufficiently spaced apart from each other, some channels may overlap with other channels.

Figure 3:
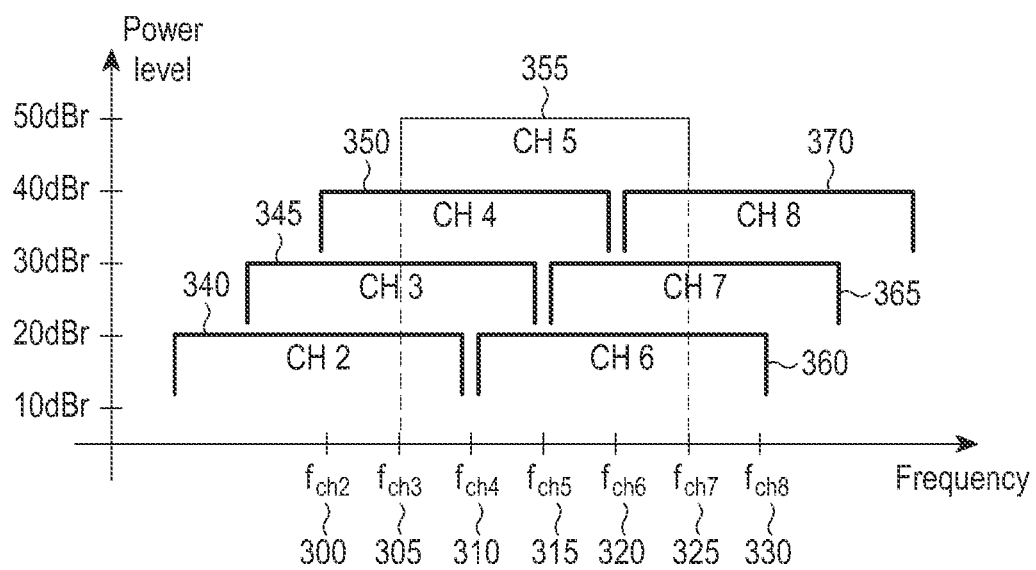
FIG. 3 is a 2-Dimensional (2D) graph showing states of Channel 5 and channels adjacent thereto according to an embodiment of the present disclosure.

FIG. 3 is a 2-Dimensional (2D) graph showing states of Channel 5 and channels adjacent thereto according to an embodiment of the present disclosure. Referring to FIG. 3, frequencies $f_{ch2}$ 300, $f_{ch3}$ 305, $f_{ch4}$ 310, $f_{ch5}$ 315, $f_{ch6}$ 320, $f_{ch7}$ 325, and $f_{ch8}$ 330 are the center frequencies of Channel 2 340, Channel 3 345, Channel 4 350, Channel 5 355, Channel 6 360, Channel 7 365, and Channel 8 370, respectively. As illustrated in FIG. 3, a frequency use band of the Channel 5 355, located to the left of the center frequency $f_{ch5}$ 315 of the Channel 5 355, overlaps with the Channel 2 340, the Channel 3 345, and the Channel 4 350, and a frequency use band of the Channel 5 355, located to the right of the center frequency $f_{ch5}$ 315 of the Channel 5 355, overlaps with the Channel 6 360, the Channel 7 365, and the Channel 8 370.

Figure 4:
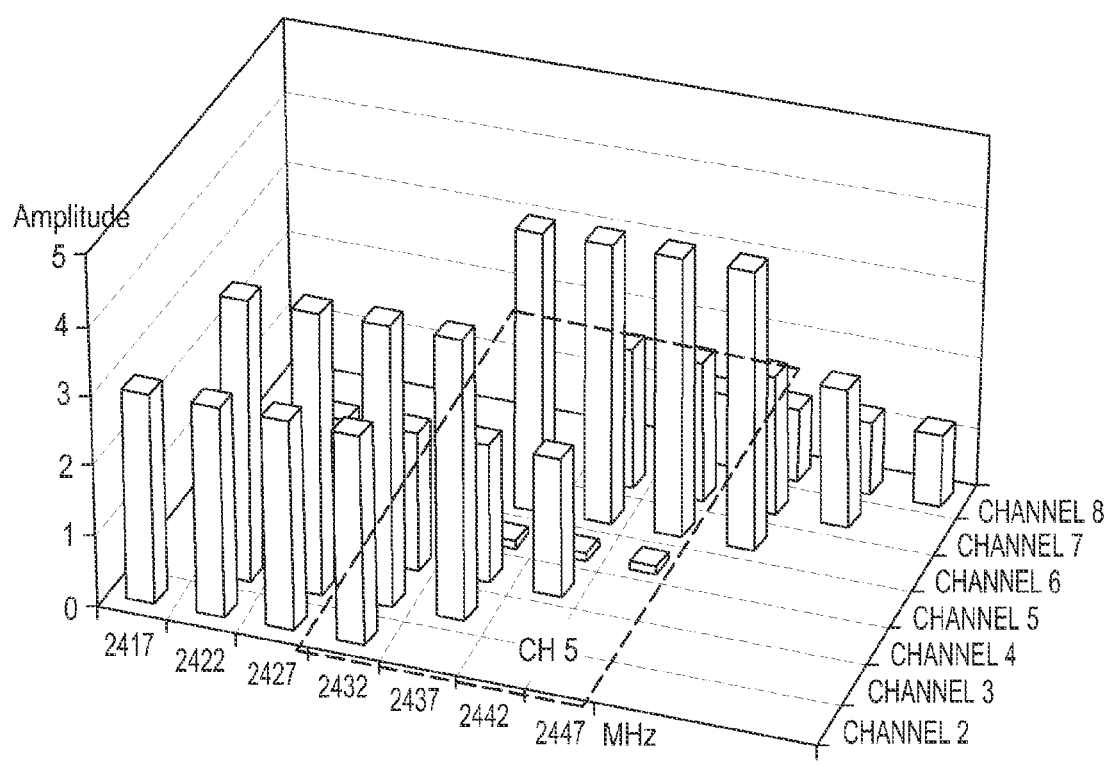
FIG. 4 is a 3-Dimensional (3D) graph showing states of Channel 5 and channels adjacent thereto and that overlap with the Channel 5 according to an embodiment of the present disclosure.

FIG. 4 is a 3-Dimensional (3D) graph showing states of the Channel 5 and channels adjacent thereto and that overlap with the Channel 5 according to an embodiment of the present disclosure.

Referring to FIG. 4, a 3D graph showing the states of the Channel 2 340 to the Channel 8 370 is illustrated. As shown in FIG. 4, the frequency use band of the Channel 5 355 overlaps partially with the frequency use bands of the Channel 2 340 to the Channel 8 370.

FIGS. 5 to 8 are views for describing a method of digitizing the states of channels in the local communication system 10 according to an embodiment of the present disclosure.

Figure 5:
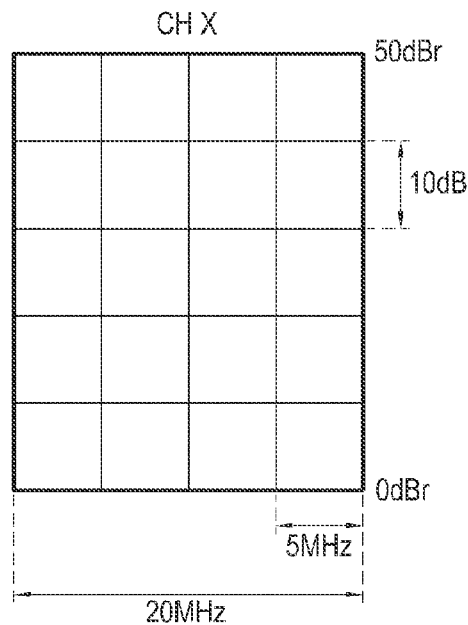
FIG. 5 is a view for describing a Channel Usage Index (CUI) according to an embodiment of the present disclosure.
Figure 6:
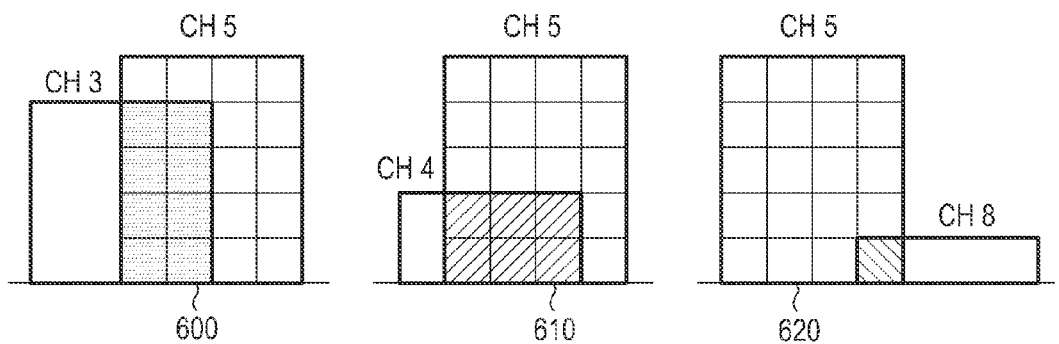
FIGS. 6, 7, and 8 are views for describing a process of calculating a CUI according to an embodiment of the present disclosure.
Figure 7:
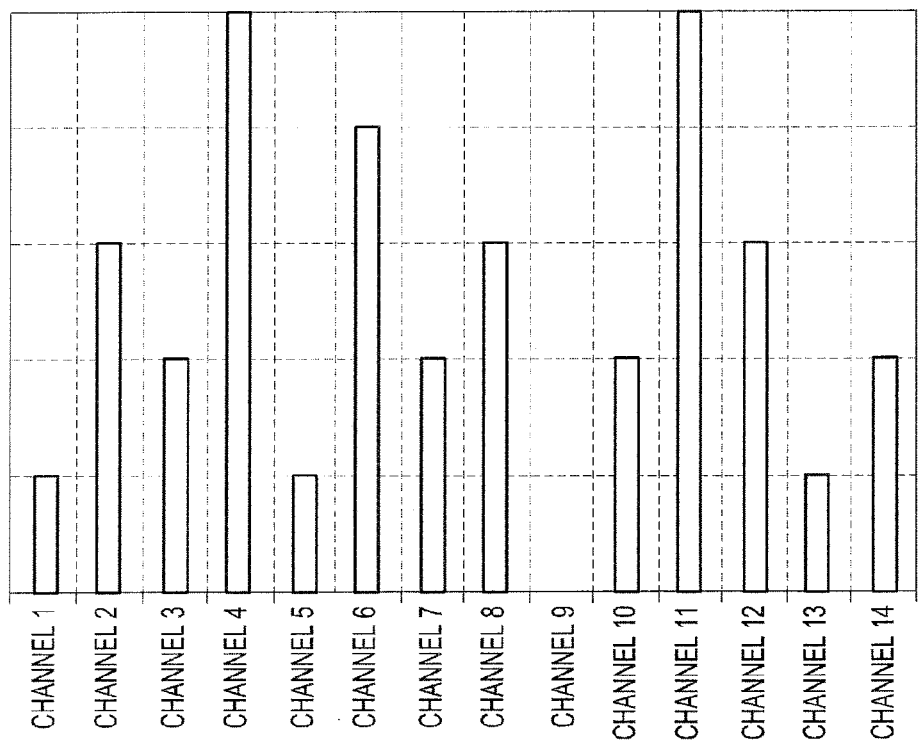
Figure 8:
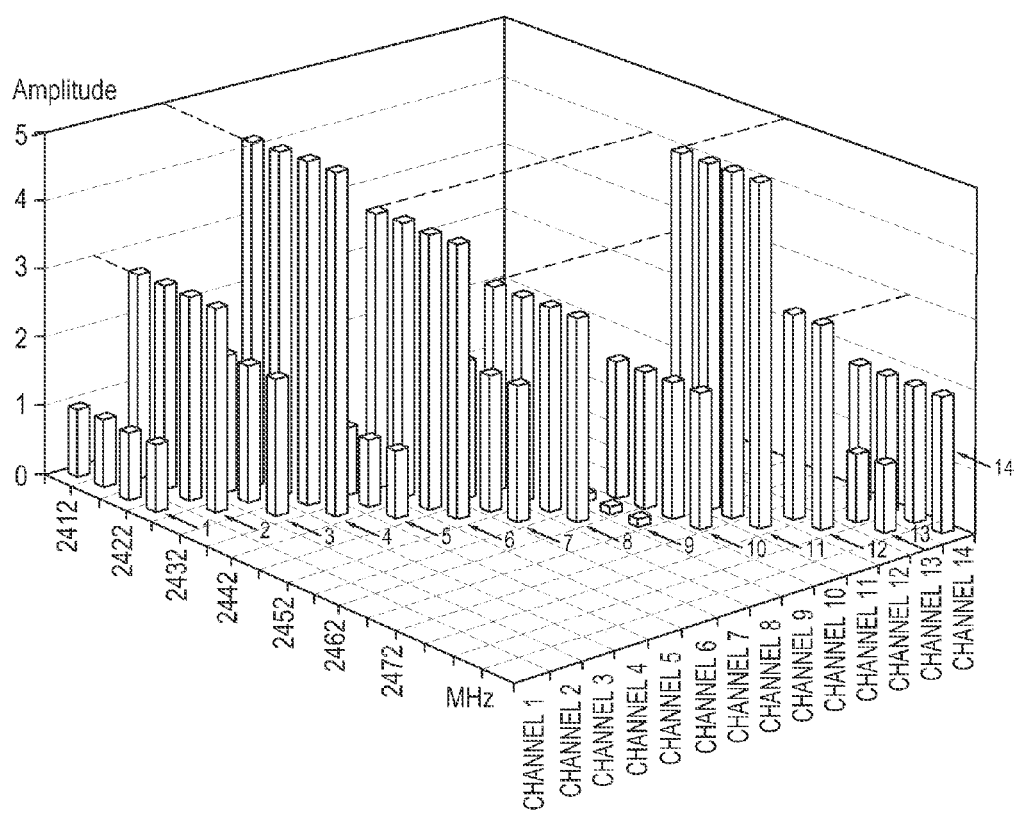

FIG. 5 is a view for describing a CUI according to an embodiment of the present disclosure. FIGS. 6, 7, and 8 are views for describing a process of calculating a CUI according to an embodiment of the present disclosure.

Because each of the channels that can be used in the local communication system 10 may overlap with adjacent channels, inter-channel interference may occur. Accordingly, the repeater 100 selects a channel after estimating inter-channel interference of individual channels. In order to estimate the inter-channel interference of individual channels, the repeater 100 calculates CUIs.

According to various embodiments of the present disclosure, in order to calculate CUIs, each channel available in the local communication system 10 is defined as a 2D structure, and the 2D structure forms a plurality of blocks to be represented in units of predetermined amplitude ranges and in units of predetermined frequency bands.

In detail, referring to FIG. 5, if a frequency use bandwidth for each channel is 20 MHz, a channel of a 2D structure in which a frequency is represented on the horizontal axis and an amplitude is represented on the vertical axis can be defined. In this case, if the horizontal axis representing the frequency is divided into four sections, and the vertical axis representing the amplitude is divided into five sections, a frequency unit on the horizontal axis may be set to 5 MHz, and an amplitude unit on the vertical axis may be set to 10 dB.

In addition, the vertical axis representing the amplitude is set to a range of 50 dB through conversion to a relative value. For example, if the maximum value of the spectrum of the entire frequency use band of the local communication system 10 is −40 dBm, 90 dB is added to −40 dBm so that 50 dBr (relative dB) is set to a maximum value, and the vertical axis representing the amplitude is set to a range from 0 dBr to 50 dBr.

In addition, because the case in which a signal of the greater strength interferes with a signal of the smaller strength results in the greater influence of interference than the case in which a signal of the smaller strength interferes with a signal of the greater strength, different weight values may be applied to the individual amplitude sections on the vertical axis representing the amplitude. For example, on the vertical axis representing the amplitude, a weight value of 1 is applied to the amplitude section from 0 dBr to 10 dBr, a weight value of 2 is applied to the amplitude section from 10 dBr to 20 dBr, a weight value of 4 is applied to the amplitude section from 20 dBr to 30 dBr, a weight value of 8 is applied to the amplitude section from 30 dBr to 40 dBr, and a weight value of 16 is applied to the amplitude section from 40 dBr to 50 dBr. For example, different weight values are applied to the individual amplitude sections on the vertical axis, for example, in such a manner that the weight values increase $2^{n-1}$ times in proportion to the amplitude unit, wherein n is a natural number and represents a number of sections into which the vertical axis is divided.

Hereinafter, a method of calculating a CUI of each channel defined as a 2D structure as described above will be described below.

FIG. 6 shows a case of calculating a CUI of Channel 5, and referring to FIG. 6, the Channel 5 overlaps with Channel 3, Channel 4, and Channel 8. Referring to a reference number 600 in FIG. 6, the overlapping parts of the Channel 5 with the Channel 3 are two cells in the section from 0 dBr to 10 dBr, two cells in the section from 10 dBr to 20 dBr, two cells in the section from 20 dBr to 30 dBr, and two cells in the section from 30 dBr to 40 dBr. Referring to a reference number 610 in FIG. 6, the overlapping parts of the Channel 5 with the Channel 4 are three cells in the section from 0 dBr to 10 dBr, and three cells in the section from 10 dBr to 20 dBr. Referring to a reference number 620 in FIG. 6, the overlapping part of the Channel 5 with the Channel 8 is one cell in the section from 0 dBr to 10 dBr. In this case, if CUIs for the Channel 3, Channel 4, and Channel 8 are calculated using weight values of $2^{n-1}$, a CUI of the Channel 3 is calculated as 30 (e.g., CUI=1(weight)*2(number of overlapping cells)+2(weight)*2(number of overlapping cells)+4(weight)*2(number of overlapping cells)+8(weight)*2 (number of overlapping cells)), a CUI of the Channel 4 is calculated as 9 (e.g., CUI=1(weight)*3(number of overlapping cells)+2(weight)*3(number of overlapping cells)), and a CUI of the Channel 8 is calculated as 1 (e.g., CUI=1 (weight)*1(number of overlapping cells)). Accordingly, a CUI of the Channel 5 is calculated as 40 (e.g., CUI=30+9+1).

Meanwhile, if a plurality of repeaters exist in the local communication system 10, the repeaters may use the same channel. In this case, the repeater 100 which tries to initially select a channel measures the strengths of signals from other repeaters that have already been selected channels and use the channels, and calculates CUIs of the respective channels.

For example, when Channel 1 and Channel 3 overlap with Channel 2, the Channel 1 is used by three repeaters, and the Channel 3 is used by two repeaters, if a CUI for the Channel 2 is calculated, a CUI of the Channel 2 is calculated with respect to each of the three repeaters using the Channel 1 and the two repeaters using the Channel 3. At this time, because repeaters using both the Channel 1 and the Channel 2 and repeaters using both the Channel 3 and the Channel 2 may use different frequency bands of the Channel 2, the repeater 100 which tries to initially select a channel calculates CUIs of all repeaters using the same channel, and sums the CUIs, detects a maximum value of the CUIs, or averages the CUIs to thereby calculate a CUI of the Channel 2.

The weight value $2^{n-1}$ can be expressed as a continuous function. If the spectrum of a specific channel is f(y), and a function representing a weight value is g(y), a CUI of the corresponding channel may be expressed as Equation (1) below.

$$\int_o^y g(y) \cdot f(y) dy \qquad \text{Equation (1)}$$

The function g(y) representing the weight value may be expressed as a monotone increasing function. The variable y is the strength of signals, f(y) is a function of representing the strength of signals measured with respect to the corresponding channel, and g(y) is a monotone increasing function according to the y value which is the strength of signals.

The weight value $2^{n-1}$ may be expressed as a discrete function, and if in the channels states as illustrated in FIGS. 7 and 8, CUIs of the individual channels are calculated, CUIs as shown in Table 1 can be obtained. In the channels states as illustrated in FIG. 7, if influences of adjacent channels are ignored, Channel 9 which is not used may be selected. However, the Channel 9 is a channel that is heavily influenced by adjacent channels.

Hereinafter, a process of calculating a CUI will be described in detail with reference to FIGS. 7 and 8. Referring to FIGS. 7 and 8, Channel 2, Channel 3, and Channel 4 interfere with Channel 1. More specifically, because the Channel 2 interferes with the Channel 1 with a degree of interference corresponding to sections from 0 dBr to 30 dBr on the vertical axis and three cells on the horizontal axis, a value of 21 (e.g., 7(weight)*3(number of overlapping cells)) is obtained for the Channel 2. In addition, because the Channel 3 interferes with the Channel 1 with a degree of interference corresponding to sections from 0 dBr to 20 dBr on the vertical axis and two cells on the horizontal axis, a value of 6 (e.g., 3(weight)*2(number of overlapping cells)) is obtained for the Channel 3. In addition, because the Channel 4 interferes with the Channel 1 with a degree of interference corresponding to sections from 0 dBr to 50 dBr on the vertical axis and one cell on the horizontal axis, a value of 31 (e.g., 31(weight)*1(number of overlapping cells)) is obtained for the Channel 4. The values are all summed so that a CUI for the Channel 1 is calculated as 58 (e.g., CUI=21+6+31). CUIs of the other channels can be also calculated in the same manner, and accordingly, Table 1 below is obtained.

TABLE 1

| Channel | CUI |
| --- | --- |
| 1 | 7*3 + 3*2 + 31*1 = 58 |
| 2 | 1*3 + 3*3 + 31*2 + 1*1 = 75 |
| 3 | 1*2 + 7*3 + 31*3 + 1*2 + 15*1 = 133 |
| 4 | 1*1 + 7*2 + 3*3 + 1*3 + 15*2 + 3*1 = 60 |
| 5 | 7*1 + 3*2 + 31*3 + 15*3 + 3*2 + 7*1 = 164 |
| 6 | 3*1 + 31*2 + 1*3 + 3*3 + 7*2 + 0*1 = 91 |

TABLE 1-continued

| Channel | CUI |
|---|---|
| 7 | 31*1 + 1*2 + 15*3 + 7*3 + 0*2 + 3*1 = 102 |
| 8 | 1*1 + 15*2 + 3*3 + 0*3 + 3*2 + 31*1 = 77 |
| 9 | 15*1 + 3*2 + 7*3 + 3*3 + 31*2 + 7*1 = 120 |
| 10 | 3*1 + 7*2 + 0*3 + 31*3 + 7*2 + 1*1 = 125 |
| 11 | 7*1 + 0*2 + 3*3 + 7*3 + 1*2 + 3*1 = 42 |
| 12 | 0*1 + 3*2 + 31*3 + 1*3 + 3*2 = 108 |
| 13 | 3*1 + 31*2 + 7*3 + 3*3 = 95 |
| 14 | 31*1 + 7*2 + 1*3 = 48 |

The repeater 100 which tries to initially select a channel may select the Channel 9 that is not used by any repeater, in the channel states as illustrated in FIGS. 7 and 8. However, if CUIs of channels are calculated, a CUI of Channel 11 is found to be a minimum value, and accordingly, the repeater 100 may select the channel 11 causing the least inter-channel interference. For example, according to various embodiments of the present disclosure, based on the CUIs of the channels, calculated in the channel states as illustrated in FIGS. 7 and 8, the Channel 11, not the Channel 9, can be determined to be the most excellent channel.

Figure 9:
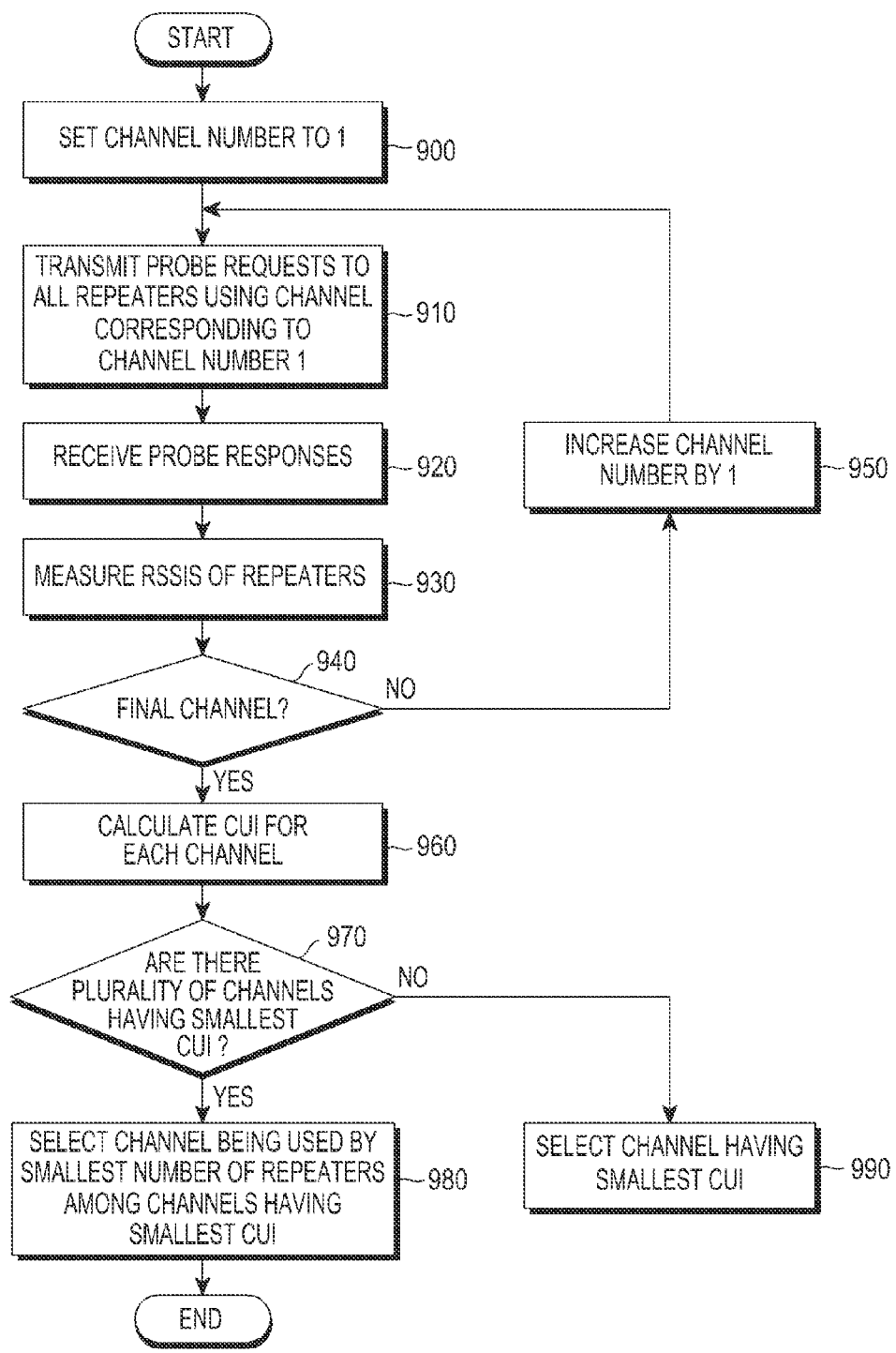
FIG. 9 is a flowchart of a method in which a repeater selects a channel in a local communication system according to an embodiment of the present disclosure.

FIG. 9 is a flowchart of a method in which a repeater selects a channel in a local communication system, according to an embodiment of the present disclosure.

Referring to FIG. 9, at operation 900, a repeater (e.g., the repeater 100 of FIG. 1) which attempts to initially select a channel sets a channel number to 1.

Thereafter, at operation 910, the repeater 100 transmits probe requests to all peripheral repeaters using a channel corresponding to the channel number 1.

At operation 920, the repeater 100 receives probe responses from the respective repeaters, At operation 930, the repeater 100 measures Received Signal Strength Indicators (RSSIs) of the respective peripheral repeaters.

Thereafter, at operation 940, in order to determine whether operations of operations 900 to 930 have been performed on all channels that can be used in the local communication system 10, the repeater 100 determines whether the operations 900 to 930 have been performed on the final channel among all channels that can be used in the local communication system 10.

If the repeater 100 determines that a current channel on which the operations 900 to 930 have been just performed is not the final channel at operation 940, then the repeaters 100 proceeds to operation 950 at which the repeater 100 increases the channel number by 1 to measure RSSIs of peripheral repeaters using the current channel.

In contrast, if the repeater 100 determines that the operations 900 to 930 have been performed on the final channel at operation 940, then the repeater proceeds to operation 960 at which CUIs of the individual channels are calculated.

According to various embodiments of the present disclosure, when a CUI of a specific channel is calculated, if at least one adjacent channel causes interference with the specific channel due to overlapping with the specific channel, then the repeater 100 instructs peripheral repeaters using the adjacent channel to calculate CUIs. Then, the peripheral repeaters respectively calculate CUIs and transmit the CUIs to the repeater 100. A CUI of the adjacent channel can be calculated by detecting the maximum value of the CUIs of the peripheral repeaters, summing the CUIs of the peripheral repeaters, or averaging the CUIs of the peripheral repeaters.

If CUIs of all channels are calculated, then the repeater 100 detects a channel having the smallest CUI, and selects the channel.

Thereafter, at operation 970, the repeater 100 determines whether a plurality of channels having the smallest CUI exist.

If the repeater 100 determines that one channel having the smallest CUI exists at operation 970, then the repeater 100 proceeds to operation 990 at which the corresponding channel is selected. For example, the channel having the smallest CUI is selected.

In contrast, if the repeater 100 determines that a plurality of channels having the smallest CUI exist at operation 970, then the repeater 100 proceeds to operation 980 at which a channel being used by a smallest number of repeaters among the channels having the smallest CUI is selected.

As described above, according to various embodiments of the present disclosure, the repeater may digitize the states of adjacent channels when trying to initially select a channel, and may initially select an optimal channel based on the digitized values regarding the states of the adjacent channels. Accordingly, the efficiencies of channels that are managed by a repeater may be maximized.

As described above, according to various embodiments of the present disclosure, the repeater can easily check degrees of interference between available channels in a local communication system.

Accordingly, the repeater can select a channel causing the least inter-channel interference.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An apparatus in a local communication system, the apparatus comprising:

a transceiver configured to perform at least one of transmitting and receiving a signal; and a controller configured to:

calculate interference between an available channel and an adjacent channel by using a number of blocks overlapped, each channel comprising at least one block represented in an amplitude axis and a frequency axis, determine a channel to be used, based on the calculated interference, and transmit or receive by the transceiver the signal on the determined channel to/from a second apparatus, wherein the overlapped blocks consist of an overlapped frequency between a frequency of the available channel and a frequency of the adjacent channel and an overlapped amplitude between an amplitude of the available channel and an amplitude of the adjacent channel.

2. The apparatus of claim 1, wherein the controller is further configured to calculate interferences for one or more peripheral apparatus using the adjacent channel.

3. The apparatus of claim 2, wherein the controller is further configured to calculate the interference between the available channel and the adjacent channel by detecting a maximum value of the interference for the one or more peripheral apparatus, by summing the interference for the one or more peripheral apparatus, or by averaging the interference for the one or more peripheral apparatus.

4. The apparatus of claim 1, wherein if a plurality of channels having a smallest interference exists, the controller is further configured to determine that the apparatus is to use a channel being used by a smallest number of apparatus among the channels having the smallest interference.

5. The apparatus of claim 1, wherein the controller is further configured to define each of the available channel and the adjacent channel as a 2-Dimensional (2D) structure which comprises the blocks being represented in units of the amplitude axis and in units of the frequency axis.

6. The apparatus of claim 1, wherein the controller is further configured to calculate the interference between the available channel and the adjacent channel by using the number of blocks overlapping with blocks representing the adjacent channel among blocks representing the available channel.

7. The apparatus of claim 5, wherein the controller is further configured to apply different weights to the amplitude ranges, respectively.

8. The apparatus of claim 5, wherein the controller is further configured to apply weights increasing in proportional to the amplitude ranges to the amplitude ranges, respectively.

9. A method for selecting a channel in an apparatus in a local communication system, the method comprising:

calculating interference between an available channel and an adjacent channel by using a number of blocks overlapped, each channel comprising at least one block represented in an amplitude axis and a frequency axis;

determining a channel to be used, based on the calculated interference; and transmitting or receiving a signal on the determined channel, wherein the overlapped blocks consist of an overlapped frequency between a frequency of the available channel and a frequency of the adjacent channel and an overlapped amplitude between an amplitude of the available channel and an amplitude of the adjacent channel.

10. The method of claim 9, wherein the calculating of interference between the available channel and the adjacent channel comprises:

calculating interferences for one or more peripheral apparatus using the adjacent channel.

11. The method of claim 10, wherein the calculating of interference between the available channel and the adjacent channel comprises at least one of:

calculating the interference between the available channel and the adjacent channel by detecting a maximum value of the interference for the one or more peripheral apparatus, summing the interference for the one or more peripheral apparatus, or averaging the interference for the one or more peripheral apparatus.

12. The method of claim 9, wherein the determining that the apparatus is to use the channel having a smallest interference as the channel that the apparatus is to use comprises, if there are a plurality of channels having the smallest interference, determining that the apparatus is to use a channel being used by a smallest number of apparatus among the channels having the smallest interference.

13. The method of claim 9, wherein the calculating of the interference between the available channel and the adjacent channel comprises:

defining each of the available channel and the adjacent channel as a 2-Dimensional (2D) structure which comprises the blocks being represented in units of the amplitude axis and in units of the frequency axis.

14. The method of claim 9, wherein the calculating of the interference between the available channel and the adjacent channel by using blocks overlapped comprises:

calculating the interference between the available channel and the adjacent channel by using the number of blocks overlapping with blocks representing the adjacent channel among blocks representing the available channel.

15. The method of claim 13, wherein the calculating of the interference between the available channel and the adjacent channel comprises:

applying different weights to the amplitude ranges, respectively.

16. The method of claim 13, wherein the calculating of the interference between the available channel and the adjacent channel comprises:

applying weights increasing in proportional to the amplitude ranges to the amplitude ranges, respectively.

17. A non-transitory computer-readable storage medium storing instructions that, when executed, cause at least one processor to perform the method of claim 9.

18. An apparatus of a local communication system, comprising:

a transceiver configured to transmit or receive a signal; and a controller configured to:

define each of an available channel and an adjacent channel as a 2-dimensional (2D) structure, the 2D structure forming a plurality of blocks to be represented in units of predetermined amplitude ranges and in units of predetermined frequency bands, calculate an interference of the available channel with the adjacent channel by using a number of blocks overlapping with blocks formed by the adjacent channel among blocks formed by the available channel, determine that the calculated interference for the available channel is at a minimum value, select the available channel based on the calculated interference, and transmit or receive the signal on the available channel, wherein the overlapped blocks consist of an overlapped frequency between a frequency of the available channel and a frequency of the adjacent channel and an overlapped amplitude between an amplitude of the available channel and an amplitude of the adjacent channel.

19. The apparatus of claim 18, wherein the controller is further configured to calculate interferences for one or more peripheral repeaters using the adjacent channel.

20. The apparatus of claim 19, wherein the controller is further configured to calculate the interference of the available channel with the adjacent channel by detecting a maximum value of the interferences for the one or more peripheral repeaters, by summing the interferences for the one or more peripheral repeaters, or by averaging the interferences for the one or more peripheral repeaters.

* * * * *